(12) United States Patent
Arai

(10) Patent No.: US 7,878,565 B2
(45) Date of Patent: Feb. 1, 2011

(54) DISC PICKING DEVICE AND DISC PROCESSING APPARATUS HAVING THE SAME

(75) Inventor: Kenichiro Arai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 736 days.

(21) Appl. No.: 11/790,777

(22) Filed: Apr. 27, 2007

(65) Prior Publication Data

US 2007/0268790 A1 Nov. 22, 2007

(30) Foreign Application Priority Data

May 16, 2006 (JP) .......................... P2006-136171

(51) Int. Cl.
*B25J 15/10* (2006.01)
(52) U.S. Cl. ...................... 294/93; 294/902; 414/796.6; 414/796.9
(58) Field of Classification Search .............. 414/796.6, 414/796.9, 941; 294/93–95, 97, 902; 279/2.21, 279/2.22
See application file for complete search history.

(56) References Cited

U.S. PATENT DOCUMENTS 4,726,615 A * 2/1988 Goldberg ...................... 294/16
5,000,651 A * 3/1991 Akagawa et al. ............ 414/741
5,897,153 A * 4/1999 Philipps et al. ................ 294/93
5,934,865 A * 8/1999 Meadows ................. 414/796.9
6,041,703 A * 3/2000 Salisbury et al. .............. 101/37
6,490,232 B2 12/2002 Sato
6,760,052 B2 * 7/2004 Cummins et al. ........... 347/171
6,802,070 B2 10/2004 Britz et al.
7,360,812 B2 * 4/2008 Ionescu ..................... 294/27.1
7,540,237 B2 * 6/2009 Kubin et al. .................. 101/44

FOREIGN PATENT DOCUMENTS

| JP | 09-245405 | 9/1997 |
|---|---|---|
| JP | 10-040619 | 2/1998 |
| JP | 11-185332 | 7/1999 |
| JP | 2000-117206 | 4/2000 |
| JP | 2001-283498 | 10/2001 |
| JP | 2002-170308 | 6/2002 |
| JP | 2003-331479 | 11/2003 |
| JP | 2005-025888 | 1/2005 |
| KR | 10-2005-0037276 | 4/2005 |

* cited by examiner

*Primary Examiner*—Dean J Kramer
(74) *Attorney, Agent, or Firm*—Nixon & Vanderhye P.C.

(57) ABSTRACT

A disc picking device having an engaging member for engaging a disc includes: a contact portion having a contact face for contacting an upper face of the disc; an arm which movably supports the engaging member and has the contact portion; and a moving mechanism moving the arm in a contacting direction for contacting the upper face of the disc, wherein the moving mechanism supports the arm such that the contact portion can be moved in a direction opposite to the contacting direction.

7 Claims, 13 Drawing Sheets

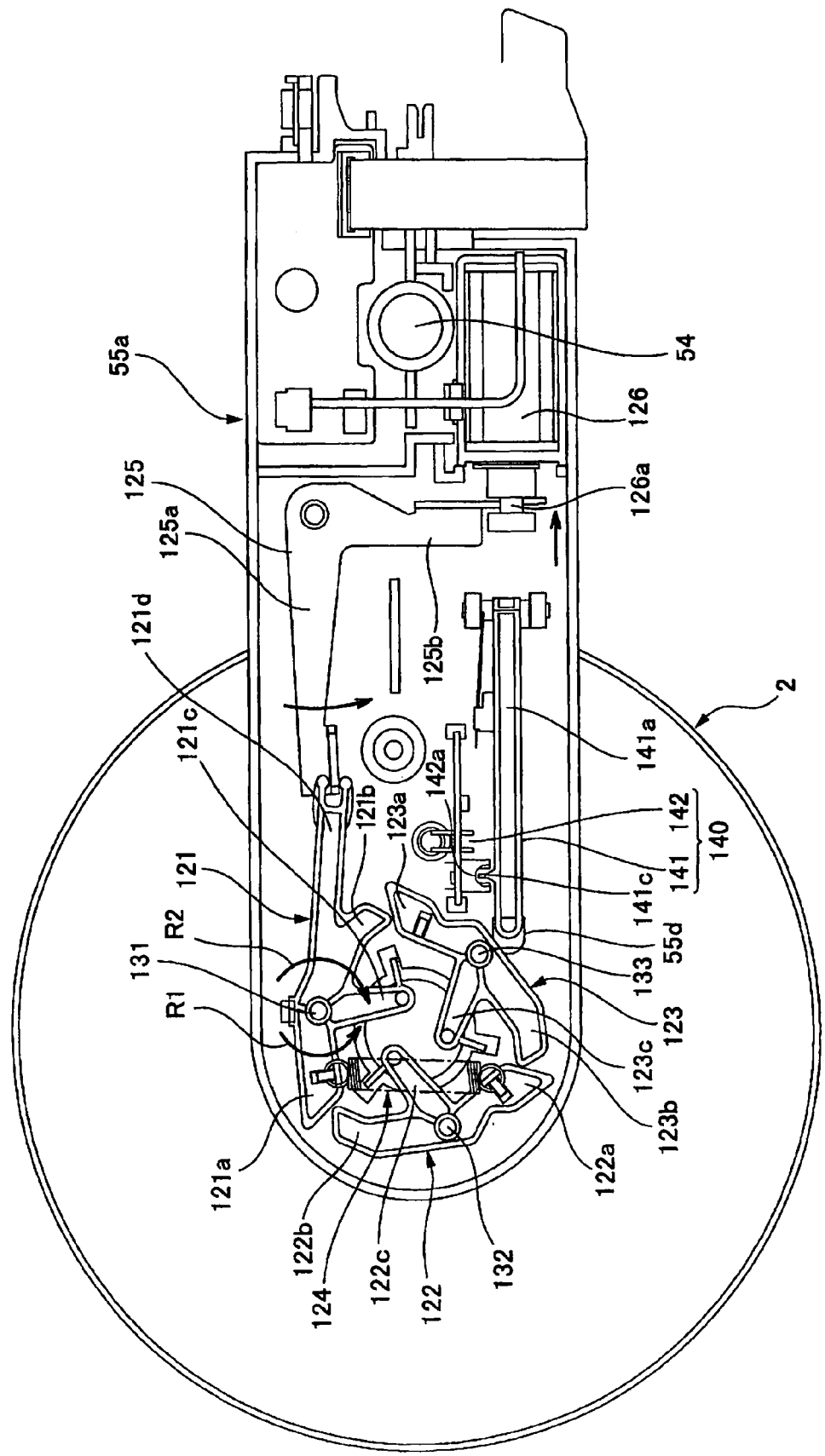

DISC PICKING DEVICE AND DISC PROCESSING APPARATUS HAVING THE SAME

BACKGROUND

1. Technical Field

The present invention relates to a disc picking device which picks a disc by an engaging member. More specifically, the invention relates to a disc picking device capable of appropriately performing the operation of picking the disc without incurring any disc damage or engaging defection of the engaging member and a disc processing apparatus having the disc picking device.

2. Related Art

In a disc processing device such as a disc dubbing device, which writes data in multiple discs such as blank CDs and a CD/DVD publisher which can publish a disc using a produced disc by writing data and printing a label, generally, multiple blank discs or recorded discs are loaded into a stacker such that the discs are stacked in a thickness direction. Gripping devices for gripping a disc loaded in a stacker including a configuration in which a disc is gripped by inserting three gripping claws into a center hole of a disc and expanding the gripping claws in a relative diameter direction of the center hole to push the inner circumference face of the center hole are known.

In Patent Document 1 (U.S. Pat. No. 6,802,070), a CD transporting device is disclosed. In this CD transporting device, a disc is gripped by inserting three gripping pieces (gripping portion) into a center hole of a CD and expanding the gripping pieces in a radial direction to push the inner circumference face of the center hole.

In order to expand the three gripping pieces in the radial direction, two gripping claws are fixed, and the remaining one gripping piece is moved in a direction away from the two gripping claws, thereby increasing the area of the circumscribed circle of the three gripping pieces.

In an arm to which the gripping pieces are attached, a position sensor for detecting a surface of a CD is disposed, and the insertion of the three gripping pieces into the center hole of the CD is detected based on the output of the position sensor.

When insertion of the gripping pieces into the center hole of the disc cannot be precisely detected by the position sensor, there is a possibility that a problem such as a gripping defection and disc damage occurs. For example, when the insertion of the gripping pieces is detected before the gripping pieces are sufficiently inserted into the center hole of the disc due to a manufacture error of the gripping piece, the arm, or the like, due to an attachment error of the position sensor to the arm, or due to a detection error of the position sensor, and the like, so that the insertion is stopped, the disc is not assuredly gripped by the gripping pieces, and accordingly, the disc may fall down while being transported. On the other hand, when the detection of the insertion of the gripping pieces is late, a part such as a hub to which the gripping pieces are attached may collide with an edge portion of the center hole of the disc causing damage the surface of the disc, and in some cases, there is a possibility that the disc is destroyed.

Accordingly, the non-uniformity of the stop position of the gripping pieces caused by the position sensor needs to be eliminated. It is very difficult, however, to remove the non-uniformity of a normal position of the gripping pieces caused by manufacture errors and attachment errors of the components, a detection error of the position sensor, and the like.

In Patent Document 2 (JP-A-2003-331479), a clamper base (contact portion) contacting an upper face of a disc is supported to be rotatable with respect to a bracket (arm) lifted by a lifting mechanism in a direction opposite to the insertion direction, and an upper face of the uppermost disc of a disc storage portion is pressed by a spring force of a torsion spring after the clamper contacts the upper face of the disc.

However, according to the technology disclosed in Patent Document 2, a rotating mechanism should be provided in the bracket to make the bracket thick and heavy, and consequently, the technology is not appropriate for high-speed transport of a disc.

SUMMARY

An advantage of exemplary aspects of the invention is to provide a picking device capable of responding to high speed transport of a disc by making the arm moved by a moving mechanism thin to decrease the weight thereof. The advantage can be attained by at least one of the following aspects:

A first aspect of the invention provides a disc picking device having an engaging member for engaging a disc comprising; a contact portion having a contact face for contacting an upper face of the disc; an arm which movably supports the engaging member and has the contact portion; and a moving mechanism moving the arm in a contacting direction for contacting the upper face of the disc, wherein the moving mechanism supports the arm such that the contact portion can be moved in a direction opposite to the contacting direction.

In the picking device described herein, since the arm which has the contact portion for contacting the upper face of the disc is attached to the moving mechanism such that the contact portion can be moved in a direction opposite to the contacting direction, when the contact portion contacts the disc, the movement of the arm is stopped, and only the moving mechanism can move, thereby preventing damage to the disc. In addition, since any moving mechanism for relatively moving the contact portion and the moving mechanism is not required in the vicinity of the contact portion of the arm, the arm can be made thin and light.

In this context, when the urging member urging the arm such that the contact portion is located in a predetermined position with respect to the moving mechanism is preferably included, the predetermined position can be adequately maintained in spite of any speed variance of the moving mechanism with regard to the weight of the arm.

In addition, the arm preferably moves parallel to a moving direction with respect to the moving mechanism. As such, the contact portion is moved parallel to the upper face of the disc, and accordingly, the contact portion does not apply a weight biased on one side to the disk. This aspect is especially preferable for a type of a gripping device in which the gripping portion is inserted into the disc center hole while pushing the inner wall of the center hole, since each gripping portion can push the inner wall at the same time, and any biased weight is thus not applied to the disc.

In addition, in this case, a disc detecting mechanism for detecting a stop position of the contact portion for contacting the disc to be gripped may be mounted in the arm.

The disc picking device according to an exemplary embodiment of the invention may be used for a disc processing apparatus having a disc storage portion for storing stacked discs including a CD and a DVD, for example, a CD dubbing apparatus or a CD publisher.

In a picking device according to an exemplary embodiment of the invention, an engaging member is supported by a support part in a movable manner in a direction opposite to the contacting direction, and the movement of the engaging member is continuously blocked by an elastic member. For example, when the engaging member contacts the surface of a disc as the engaging member is inserted into the disc center hole, the elastic member is elastically deformed to reduce the collision force. In addition, the elastic member is elastically deformed, so that the engaging member cannot move further. Accordingly, even when there is a deviation in the stop position of the engaging member in inserting the engaging member, the disc is not damaged. In addition, the insertion amount is set in consideration of the non-uniform stop positions, and accordingly, damage to the disc caused by the gripping claws can be prevented.

In another exemplary embodiment of the invention, a disc picking device includes a plurality of gripping portions positionable within a center hole of a disc, the gripping portions gripping the disc via the center hole; a contact portion disposed spaced from the gripping portions, the contact portion including a contact face positioned to contact an upper face of the disc; an arm on which the gripping portions are movable supported, wherein the contact portion is attached to the arm; and a movable housing supporting the gripping portions and the contact portion, the housing moving the gripping portions in an inserting direction into the center hole of the disc. The housing supports the contact portion such that the contact portion can be moved in a direction opposite to the inserting direction.

The present disclosure relates to the subject matter contained in Japanese patent application No. 2006-136171 filed on May 16, 2007, which is expressly incorporated herein by reference in its entirety.

BRIEF DESCRIPTION OF THE DRAWINGS

The invention will be described with reference to the accompanying drawings, wherein like numbers reference like elements.

FIG. 8 is a plan view of the gripping mechanism.

DESCRIPTION OF EXEMPLARY EMBODIMENTS

Hereinafter, an example of a disc processing device including a disc picking device according to an embodiment of the present invention will be described with reference to the accompanying drawings.

(Whole Configuration)

Figure 1:
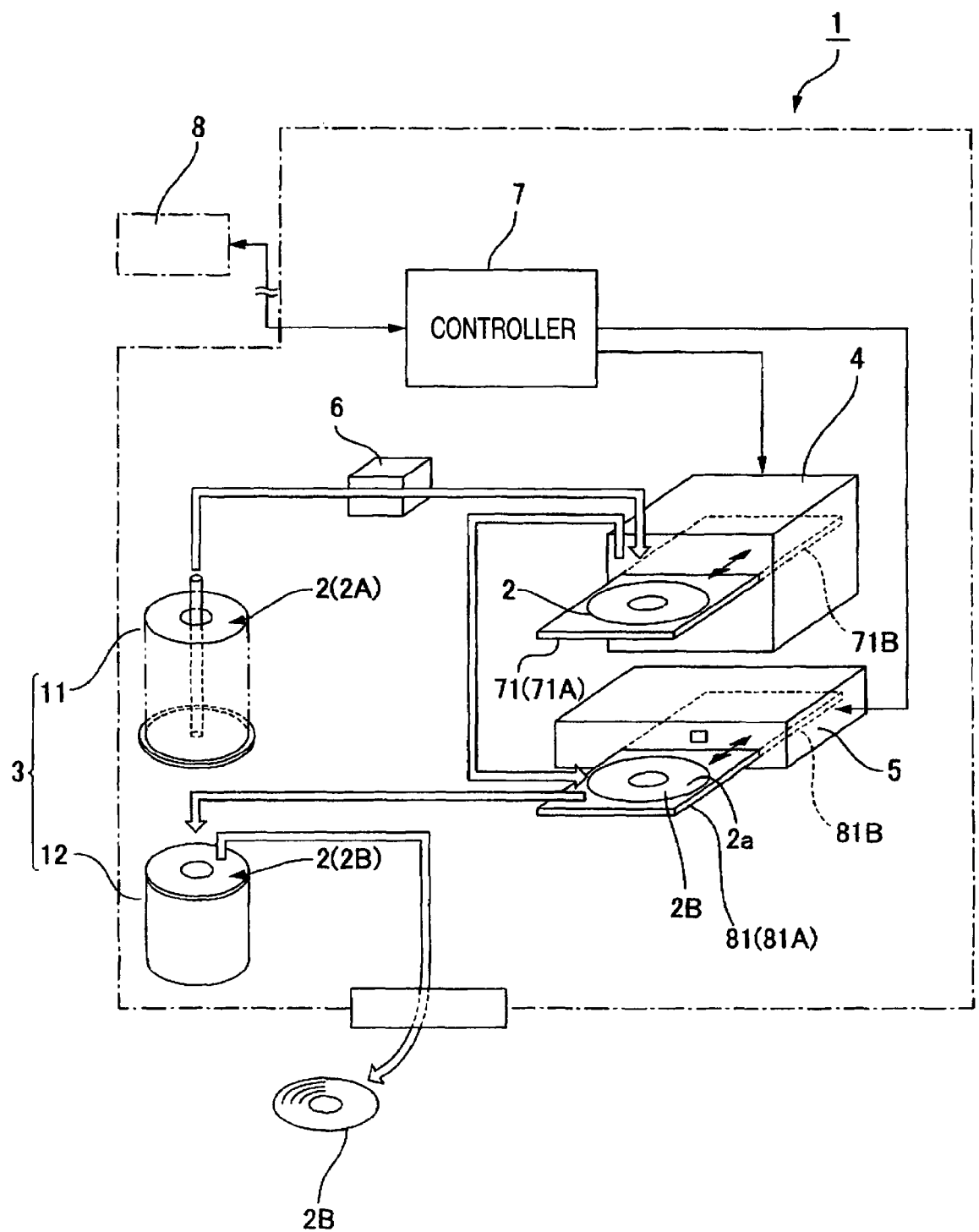
FIG. 1 is a schematic view showing a configuration of a CD publisher according to an exemplary embodiment of the present invention.

FIG. 1 is a schematic view showing a configuration of a CD publisher according to an exemplary embodiment of the present invention. The CD publisher 1 in this example includes a disc storage portion 3 for storing a disc 2 (blank disc 2A and a recorded disc 2B) such as a CD or a DVD, a disc drive 4 which records data into the disc 2 and retrieves data from the disc 2, a label printer 5 for printing a label including a title indicating recorded data, year/month/date of recording, and the like on a label side 2a of the disc 2 in which data is recorded, a disc moving mechanism 6 for transporting the disc 2, and a control unit 7 responsible for controlling other units. The control unit 7 is connected to a higher rank device 8 such as a control server or a personal computer through a communication line including a LAN. From the higher rank device 8, a disc manufacturing request (data recording request or data rewriting request), a disc publishing request, or the like is input to the control unit 7.

The disc 2 is loaded or unloaded by the disc moving mechanism 6 with a disc tray 71 of the disc drive 4 drawn out to a disc replacing position 71A. The recording or retrieving of data is performed on the disc 2 which has been guided into the disc tray 71 in a processing position 71B where the disc tray 71 is inserted into the disc drive 4.

The label printer 5 is arranged below the disc drive 4 and includes a printer tray 81 for transporting the disc 2. The printer tray 81 reciprocates between a print position 81B and a disc replacing position 81A. The disc 2 is loaded or unloaded by the disc moving mechanism 6 in the disc replacing position 81A. In this example, the disc replacing position 81A of the printer tray 81 is right below the disc replacing position 71A of the disc tray 71 of the disc drive 4.

The disc storage portion 3 includes first and second stackers 11 and 12 which store the discs 2 stacked in the thickness direction. In this example, the first stacker 11 and the second stacker 12 are vertically arranged on the same shaft. Generally, the first stacker 11 serves as a blank disc stacker for storing a blank disc 2A, and the second stacker 12 serves as a recorded disc stacker for storing a recorded disc 2B.

Figure 2:
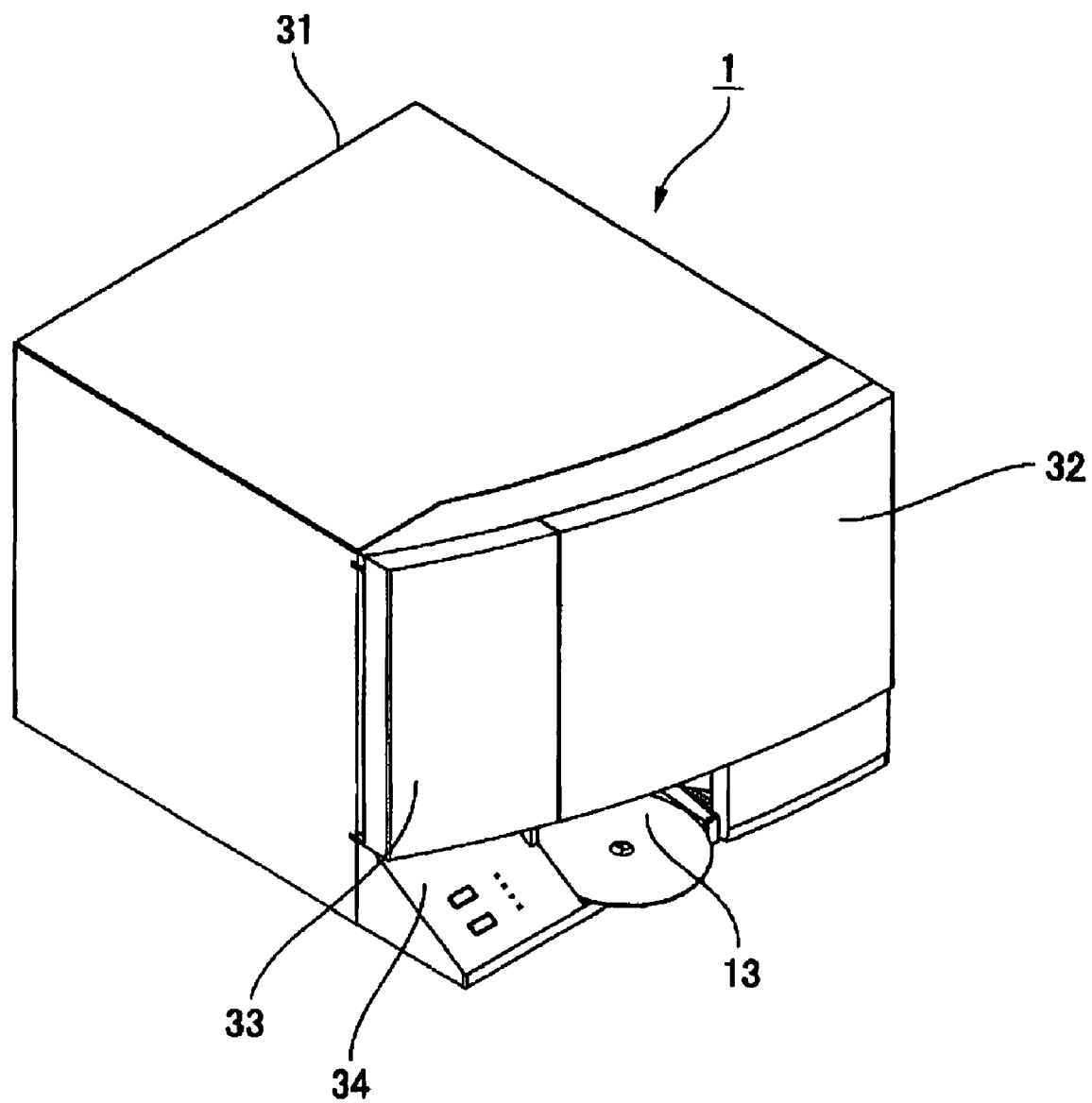
FIG. 2 is a perspective view showing a detailed example of an external appearance of a CD publisher.

A typical operation of the CD publisher 1 for recording a disc is described as follows. When a data recording request is received from the higher rank device 8, the CD publisher 1 takes out a blank disc 2A from the first stacker 11 of the disc storage portion 3, sets the blank disc 2A in the disc drive 4, and records record data which is supplied together with the data recording request. Next, the CD publisher 1 transports the recorded disc 2 to the label printer 5 and prints label printing data which is supplied together with the data recording request on a label side 2a of the disc 2. The CD publisher 1 stores the recorded disc 2B after the printing process in the second stacker 12 of the disc storage portion 3. When there is a disc publishing request, the corresponding recorded disc 2B is taken out from the second stacker 12 by the disc moving mechanism 6 and discharged to a disc discharge port 13 (FIG. 2). As a result, the recorded disc 2B can be taken out from the CD publisher 1.

(Detailed Configuration Example of CD Publisher)

Next, a detailed configuration example of a CD publisher 1 according to an exemplary embodiment of the invention will be described with reference to FIGS. 2 to 11.

FIG. 2 is a perspective view showing an external appearance of the CD publisher 1. The CD publisher 1 includes a case 31 with doors 32 and 33 which can be opened or closed to the left or right sides attached to a front face of the case 3. An operation face 34 on which a display lamp, an operation button, and the like are arranged is formed below the doors 32 and 33, and a disc discharge port 13 is open beside the operation face 34.

Figure 3:
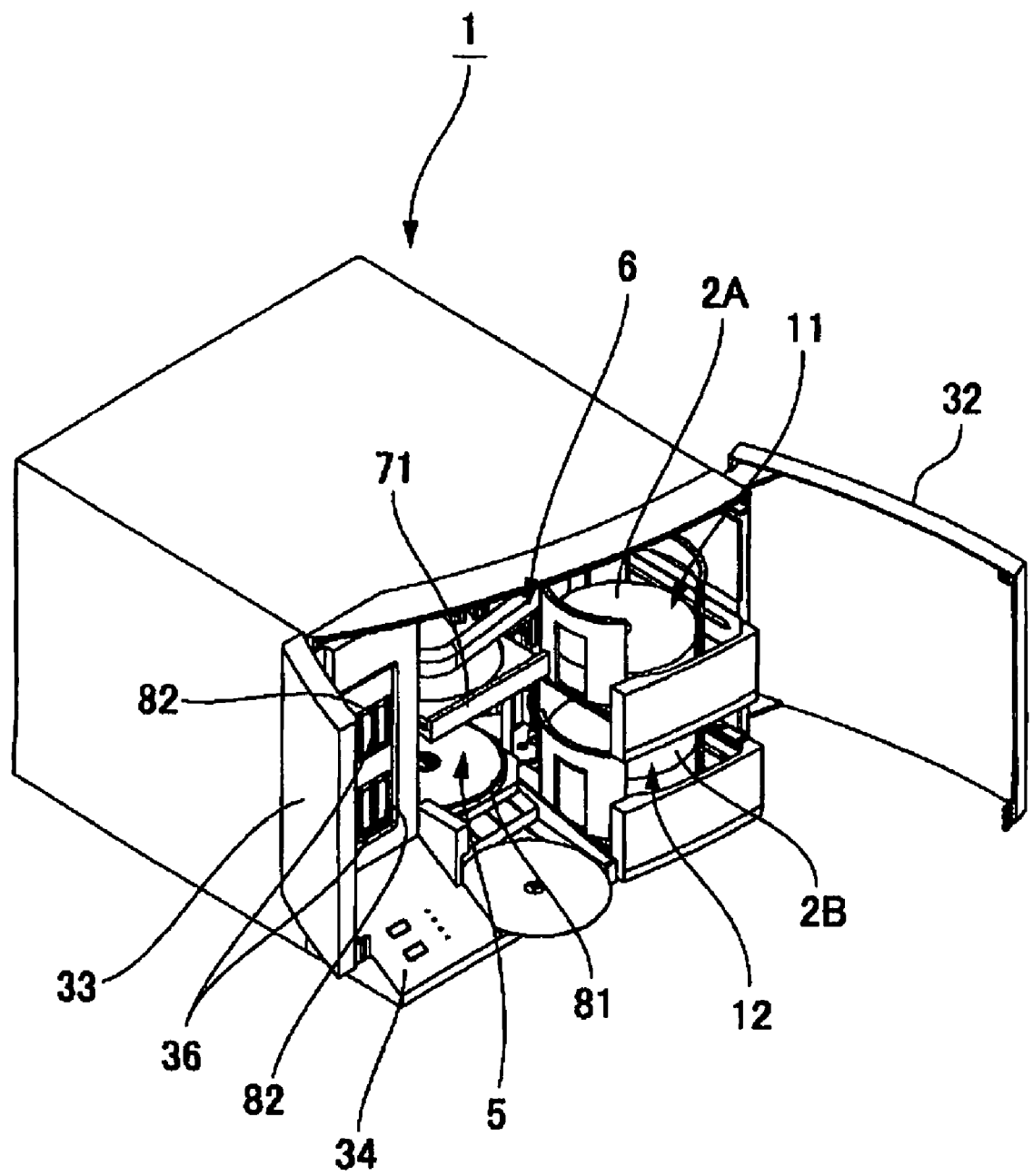
FIG. 3 is a perspective view of the CD publisher where the doors are opened.

FIG. 3 is a perspective view of the CD publisher 1 when the doors 32 and 33 are opened. The door 32 on the left side is locked closed, and a personal authorization mechanism, for example, a fingerprint sensor or the like is arranged on the operation face 34, so that the door 32 is configured to be opened by only an authorized person. Alternatively, the door 32 may be configured to be openable and closable according to a direction from the higher rank device 8. On the other hand, the door 33 on the right side is opened or closed at a time when an ink cartridge of the label printer 5 is to be replaced. When the door 33 is opened, a cartridge installation unit 36 is exposed. In the example, the cartridge installation unit 36 includes two upper and lower levels.

Figure 4:
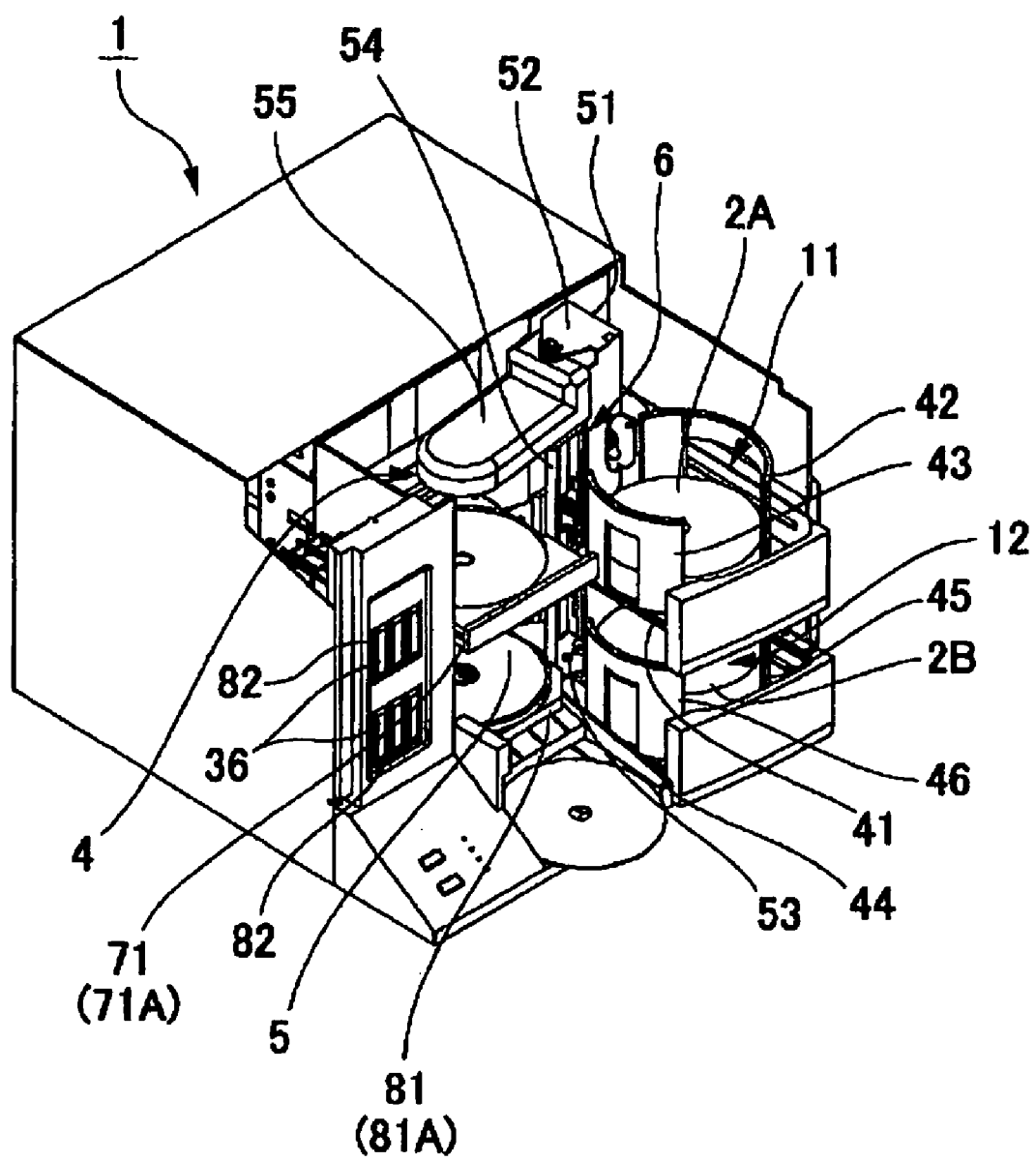
FIG. 4 is a perspective view showing an internal configuration of the CD publisher.

FIG. 4 is a perspective view of the CD publisher 1 when the doors 32 and 33 and a part of the case 31 are removed. Referring to FIGS. 3 and 4, inside the case 31 of the CD publisher 1, a blank disc stacker 11 and a recorded disc stacker 12 are vertically disposed on the same shaft in a left side part. The blank disc stacker 11 includes a slide plate 41 which can be extracted horizontally in a forward direction and a pair of left and right casing boards 42 and 43 in the shape of circular arcs which are disposed vertically on the slide plate 41. A stacker which can receive a disc 2A from an upper side and store the disc 2A stacked in a thickness direction is formed by the slide plate 41 and the casing boards 42 and 43. The operation of storing or supplementing the disc 2A in or to the blank disc stacker 11 can be simply performed by opening the door 32 and extracting the slide plate 41 in a forward direction.

The recorded disc stacker 12 in the lower side has the same configuration. The recorded disc stacker 12 includes a slide plate 44 which can be extracted horizontally in a forward direction and a pair of left and right casing boards 45 and 46 in the shape of circular arcs which are disposed vertically on the slide plate 44. A stacker which can receive a disc 2B from an upper side and store the disc 2B stacked on the same shaft is formed by the slide plate 41 and the casing boards 42 and 43.

A disc moving mechanism 6 is disposed in the rear side of the blank disc stacker 11 and the recorded disc stacker 12. The disc moving mechanism 6 includes a chassis 51 vertically attached to the case 31, a vertical guide shaft 54 vertically extending between horizontal support plate parts 52 and 53, which are disposed in upper and lower parts of the chassis 51, and a transport arm 55 attached to the vertical guide shaft 54. The transport arm 55 can lift along the vertical guide shaft 54 and rotate on the vertical guide shaft 54 to a left or right side.

In a rear part of a side of the disc moving mechanism 6, the disc drive 4 is disposed in an upper side, and the label printer 5 is disposed in a lower side. In FIGS. 3 and 4, a disc tray 71 of the disc drive 4 in the upper side is in a disc replacing position 71A in which the disc tray 71 is drawn out forward and the printer tray 81 of the label printer 5 in the lower side is in the disc replacing position 81A in the front side. The label printer 5 is preferably an ink jet printer, and ink cartridges 82 for each color are used as an ink supplying source. The ink cartridges 82 are installed to the cartridge installation unit 36 from a front side.

Here, between the each pair of left and right casing boards 42 and 43 and 45 and 46 of the blank disc stacker 11 and the recorded disc stacker 12, a gap is formed in which the transport arm 55 of the disc moving mechanism 6 can be lifted. In addition, a gap is formed between the stackers 11 and 12 respectively disposed in the upper and lower sides, so that the transport arm 55 can rotate horizontally and locate right above the stackers 11 and 12. When the disc tray 71 in the upper side is pushed to be inserted into the disc drive 4, the transport arm 55 of the disc moving mechanism 6 is lowered, so that the printer tray 81 in the disc replacing position can be accessed by the transport arm 55. Accordingly, the disc 2 can be transported to each part by performing combined operations of lifting and rotating to the left or right side of the transport arm 55.

(Disc Moving Mechanism)

Figure 5:
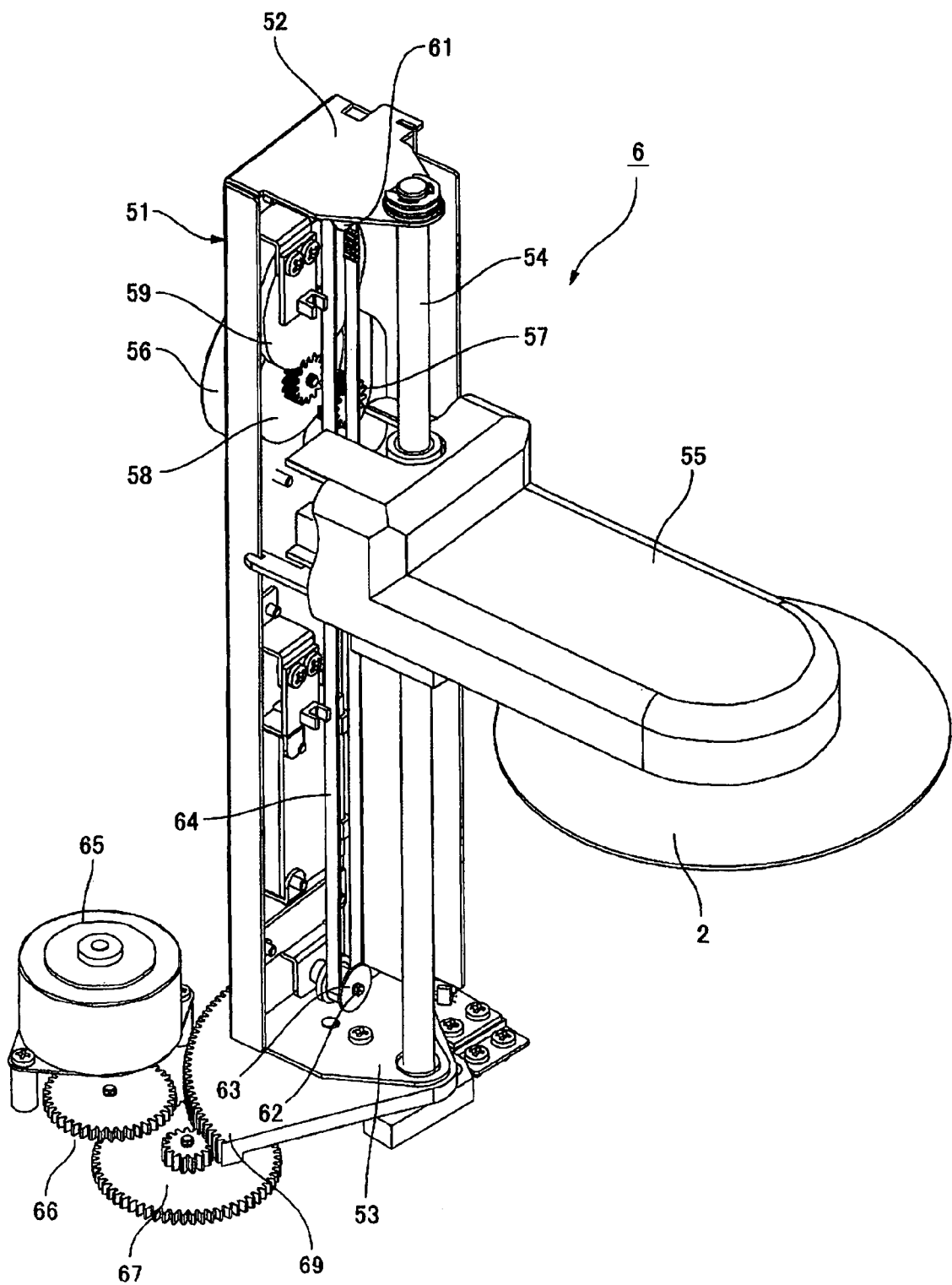
FIG. 5 is a perspective view showing a disc moving mechanism of the CD publisher.

FIG. 5 is a perspective view showing the disc moving mechanism 6. As described above, the disc moving mechanism 6 includes a chassis 51 vertically attached to the case 31, and a vertical guide shaft 54 is attached between the horizontal support plate parts 52 and 53 respectively disposed in the upper and lower parts of the chassis 51. The transport arm 55 is supported by the vertical guide shaft 54 so as to be liftable and rotatable.

A lifting mechanism of the transport arm 55 includes a motor 56 for lift which is a driving source. The rotation of the motor 56 is configured to be transferred to a driving side pulley 61 through a speed-reducing gear array including a pinion 57 which is attached to an output shaft of the motor, a mixed transfer gear 58, and a transfer gear 59. The driving side pulley 61 is supported in a position around an upper part of the chassis 51 so as to be rotatable on a horizontal rotating shaft (not shown). In a position around a lower part of the chassis 51, a driven side pulley 63 is supported so as to be rotatable on a horizontal rotating shaft 62 like the driving side pulley 61, and a timing belt 64 extends between the driving side pulley 61 and the driven side pulley 63. A rear end of the transport arm 55 is connected to one side of left and right belt parts of the timing belt 64 (The structure of the connection part will be described later with reference to FIG. 10 and other figures). As a result, when the motor 56 is driven, the timing belt 64 moves up and down, and thus the transport arm 55 attached thereto is lifted along the vertical guide shaft 54.

A rotating mechanism of the transport arm 55 includes a motor 65 for rotation which is a driving source, and a pinion (not shown) is attached to an output shaft of the motor 65. The rotation of the pinion is configured to be transferred to a final-stage gear 69 in the shape of a fan through a speed-reducing gear array having two mixed transfer gears 66 and 67. The final-stage gear 69 in the shape of a fan can rotate to the left or right side around the vertical guide shaft 54. In addition, a chassis 51 to which components of the lifting mechanism of the transport arm 55 are attached is mounted on the final-stage gear 69. When the motor 65 is driven, the final-stage gear 69 in the shape of a fan rotates to the left/right side, and accordingly, the chassis 51 which is mounted thereon rotates to the left/right side around the vertical guide shaft 54 as one structure. As a result, the transport arm 55 which is held by the lifting mechanism mounted on the chassis 51 rotates to the left/right side on the vertical guide shaft 54.

(Transport Arm and Gripping Mechanism)

Figure 6:
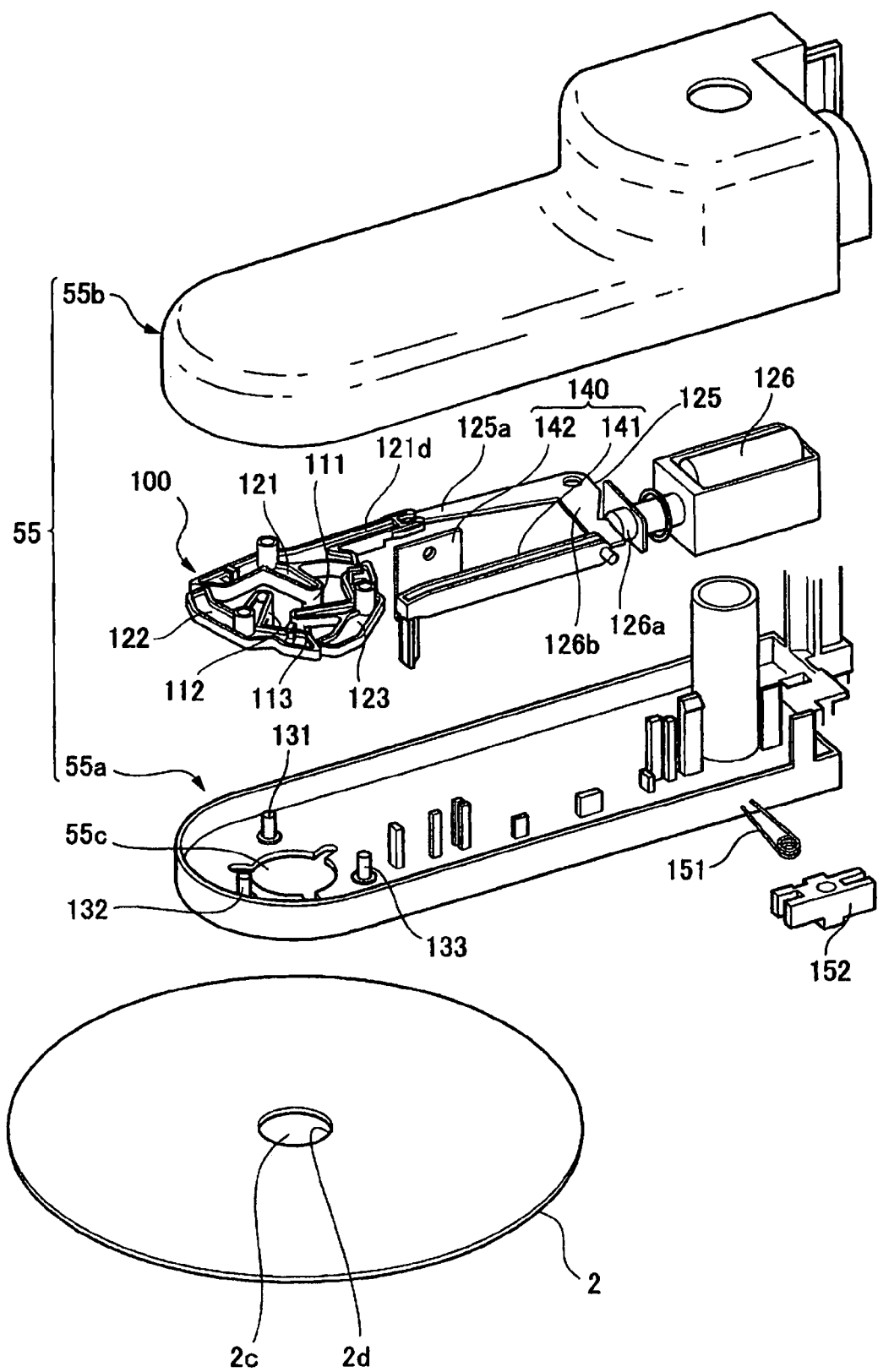
FIG. 6 is an exploded perspective view of a transport arm of the disc moving mechanism.
Figure 7:
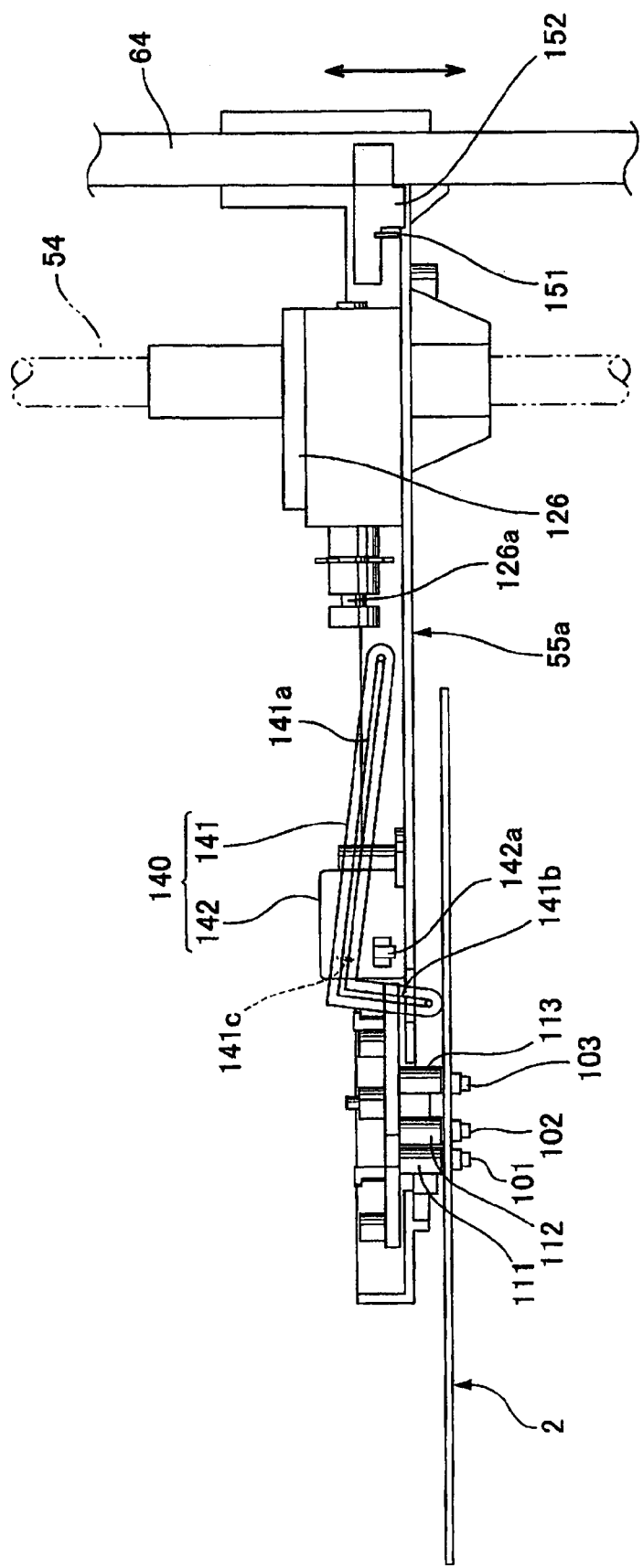
FIG. 7 is a side view showing a gripping mechanism of the disc moving mechanism.

FIG. 6 is an exploded perspective view showing major parts of the transport arm 55, FIG. 7 is a side view showing an internal structure of the transport arm 55, and FIG. 8 is a plan view showing the internal structure of the transport arm 55.

The transport arm 55 includes a thin and long arm base 55a of which a front end part is in the shape of a half circle and an arm case 55b in the shape of the same contour, which covers the arm base 55a. A gripping mechanism 100 for gripping a disc 2 is installed in the arm base 55a, and the gripping mechanism 100 is covered with the arm case 55b not to be seen. Both the arm base 55a and the arm case 55b are preferably formed by a resin formation process.

The gripping mechanism 100 includes three gripping claws (gripping member) 101 to 103 in shapes of cylinders which are disposed in the same circle at equal angular intervals therebetween. The gripping claws 101 to 103 are vertically extruded downward through a circular hole 55c formed in a front end of the arm base 55a. The disc 2 can be gripped by inserting the three gripping claws 101 to 103 into the center hole 2c of the disc 2 and pushing the gripping claws 101 to 103 outward in a radial direction.

The gripping claws 101 to 103 are formed under support pins 111 to 113 having diameters larger than those of the gripping claws 101 to 103. The support pins 111 to 113 extend upward through the circular hole 55c of the arm base 55a. The support pins 111 to 113 are respectively disposed in three rotation plates 121 to 123 which are disposed on a top face of the arm base 55a. Rotation center shafts 131 to 133 are vertically installed in the arm base 55a at equal angular intervals therebetween in a same circle in a status that the rotation center shafts surround the circular hole 55c. The rotation plates 121 to 123 are supported so as to be rotatable on the rotation center shafts 131 to 133, respectively. Pins 101a to 103a in the shapes cylinders to be described later are preferably formed of resin such as POM in the same bodies as the rotation plates 121 to 123, respectively.

The rotation plates 121 to 123 includes front and rear arm parts 121a, 121b, 122a, 122b, 123a, and 123b, respectively, which extend along the arm base 55a in an approximate circumference direction of the circular hole 55c and support arms 121c to 123c which are extruded from the center of the rotation toward an inner side of the circular hole 55c. On rear sides of front ends of the support arms 121c to 123c, the support pins 111 to 113 are vertically fixed, respectively.

A rear end of the rear arm part 122b of the rotation plate 122 is in contact with a front end face of the front arm part 121a of the rotation plate 121 so as to be slidable. Likewise, a rear end of the rear arm part 123b of the rotation plate 123 is in contact with a front end face of the front arm part 122a of the rotation plate 122 so as to be slidable. A rear end of the rear arm part 121b of the rotation plate 121 is in contact with a front end face of the front arm part 123a of the rotation plate 123 so as to be slidable. Here, the rotation plates 121 to 123 are configured to rotate in the same direction by properly setting inclination angles of the front end faces of the front arm parts 121a to 123a.

A helical extension spring 124 extends between the front arm part 121a of the rotation plate 121 and the front arm part 122a of the rotation plate 122. By the tensile force of the helical extension spring 124, the rotation plates 121 to 123 are maintained in a contacting status without rattling, and a biasing force is applied to the rotation plate 121 in a direction (direction in which the gripping claws 101 to 103 are widened) denoted by an arrow R1 shown in FIG. 8.

In this status, a circumscribed circle of the gripping claws 101 to 103 which are respectively attached to the front ends of the support arms 121c to 123c of the rotation plates 121 to 123 has a diameter larger than an inner diameter of the center hole 2c of the disc 2. In this state, when one rotation plate, for example, the rotation plate 121 is rotated in a direction denoted by an arrow R2, the other two rotation plates 122 and 123 rotates by the same angle in the same direction in concert with the rotation of the rotation plate 121. As a result, the support arms 121c to 123c of the rotation plates 121 to 123 move toward the center of the circular hole 55c, and the gripping claws 101 to 103 attached to the front ends thereof can be collected so as to be inserted into the center hole 2c of the disc 2. In this status, when the gripping claws 101 to 103 are inserted into the center hole 2c of the disc 2, and the rotation plates 121 to 123 are rotated in a reverse direction R1, the gripping claws 101 to 103 can be pushed outward in a radial direction. As a result, the gripping claws are pushed to the inner circumference 2d of the center hole 2c of the disc, so that the disc 2 is gripped.

In the gripping mechanism 100 of this example, the following mechanisms are included for rotating the rotation plates 121 to 123. An operation arm 121d which extends to the opposite side of the support arm 121c is formed in the rotation plate 121. A front end of an arm part 125a in one side of an L-shaped link 125 is connected to a front end of the operation arm 121d with the front end of the arm part 125a being freely rotated. The L-shaped link 125 can be rotated around a bent part, and a front end of the arm part 125b in the opposite side is connected to an operation rod 126a of an electromagnetic solenoid 126. When the electromagnetic solenoid 126 is in an "off" status, the operation rod 126a is extended as shown in FIG. 8. When the electronic solenoid 126 is shifted to an "on" state, the operation rod 126a is pulled in against the spring force of a built-in spring to rotate the L-shaped link 125. The rotation of the L-shaped link 125 is transferred to the rotation plate 121, the rotation plate 121 is rotated in a direction R2, and the other two rotation plates 122 and 123 are rotated by the same angle in the same direction in synchronization with the rotation of the rotation plate. As a result, separation of the gripping claws 101 to 103 can be shrunken.

As described above, in the gripping device 100 of this example, three gripping claws 101 to 103 are moved in a radial direction to be in a disc open position in which the gripping claws can be inserted into the center hole 2c of the disc 2 and a disc gripping position in which the gripping claws are pushed to the inner circumference face 2d of the center hole 2c of the disc. By acquiring the amounts of strokes of the gripping claws 101 to 103 sufficiently, the gripping claws 101 to 103 can be inserted into the center hole 2c of the disc without touching a surface of the disc. Accordingly, it is not required to form long inclination faces vertically in the front ends of the gripping claws 101 to 103 for guiding the disc 2, and the lengths of the gripping claws 101 to 103 can be shortened to be substantially equal to the thickness of the disc 2.

In addition, the rotation plates 121 to 123 disposed in a planar direction can be held to contact with one another, and when one rotation plate 121 is rotated, the other two rotation plates 122 and 123 are configured to rotate by the same angle in the same direction in concert with the rotation of the rotation plate 121. Accordingly, the rotation mechanism of the rotation plates 121 to 123 can be flattened. In other words, the mechanism for moving the gripping claws 101 to 103 can be formed in a flat configuration.

As described above, in this example, since the gripping claws 101 to 103 can be shortened, and the mechanism for moving the gripping claws 101 to 103 can be formed in a flat configuration, the gripping device can be made thin. In addition, since the gripping plates 122 and 123 have the same shape, these components can be commonly used. Accordingly, there is an advantage that the manufacturing cost can be reduced.

(Gripping Claw)

Figure 9A:
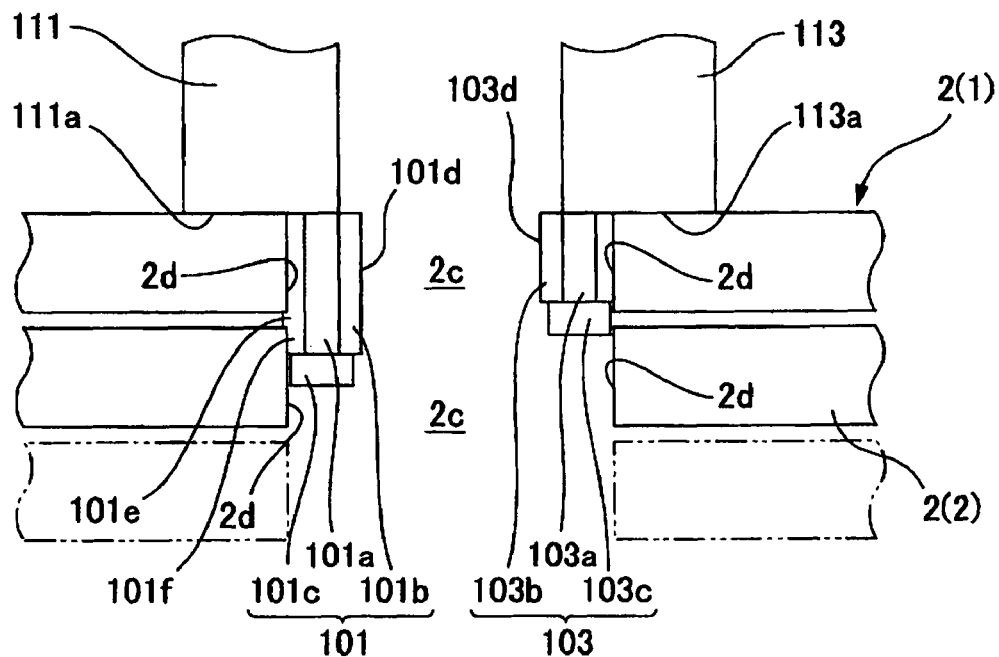
FIGS. 9A and 9B are a sectional view and a plan view of gripping claws of the gripping mechanism.
Figure 9B:
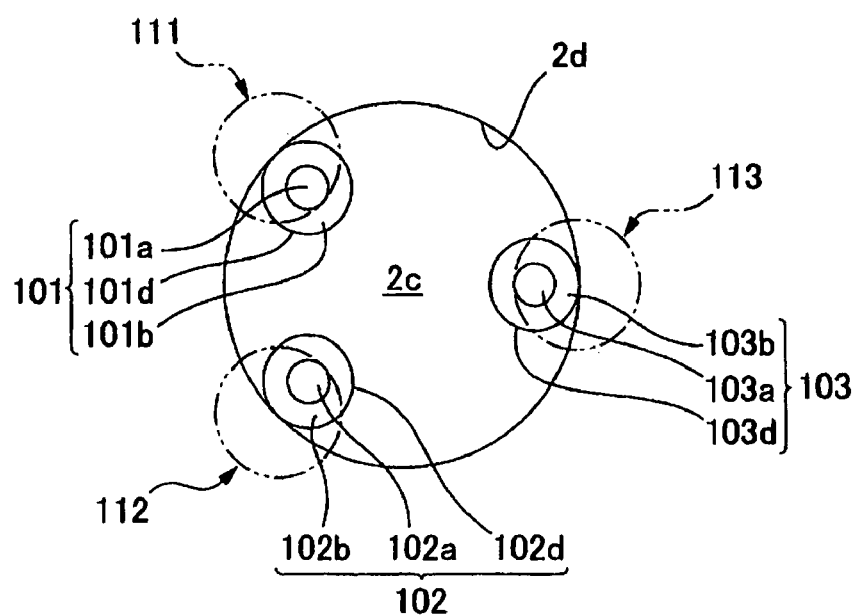

Next, the gripping claws 101 to 103 in this example will be described with reference to FIG. 9. FIG. 9(a) is a sectional view of the gripping claws 101 and 103, and FIG. 9(b) is a plan view of the gripping claws 101 to 103. The gripping claws 101 to 103 include pins 101a to 103a in the shape of a cylinder which extrude downward from lower end faces (contact portion) 111a to 113a of support pins 111 to 113 and elastic cylinders 101b to 103b formed of rubber or the like which surround the pins 101a to 103a concentrically. Under the lower ends of the pins 101a to 103a, heads 101c to 103c having large diameters for preventing falling-out are formed.

The circular outer circumference faces 101d to 103d of the elastic cylinders 101b to 103b of the gripping claws 101 to 103 are disc contacting faces which can be contacted to the inner circumference face 2d of the center hole 2c of the disc 2. The lengths of the shafts of the gripping claws 101 and 102 are configured to be greater than the length of the shaft of the gripping claw 103 and to be at least greater than the thickness of the inner circumference face 2d of the disc 2 to be gripped. In this example, the lengths of the elastic cylinders 101b and 102b of the gripping claws 101 and 102, as shown in FIG. 9(a), are configured to be a length extending the whole inner circumference face 2d of the stacked upper disc 2(1) and at least an upper part of the inner circumference face 2d of a lower disc 2(2). To the contrary, the length of the elastic cylinder 103b of the gripping claw 103 is configured to be equal to or less than the thickness of the inner circumference face 2d of the disc 2 to be gripped and, in this example, configured to be slightly less than the thickness of the inner circumference face 2d.

As shown in FIG. 9, the gripping claws 101 to 103 are inserted into a center hole 2c of an uppermost disc 2(1) among discs piled up in a thickness direction and pushed outward in a radial direction. In other words, disc contacting faces formed with elastic members 101b and 102b of the long gripping claws 101 and 102 are elastically transformed by being pushed to the inner circumference face 2d of the disc center hole 2c. However, parts 101e and 102e (only a part 101e is shown in the figure) protruded in the disc contacting face from the disc center hole 2c to the opposite side are not elastically transformed and are penetrated into the rear side of the disc 2(1). In other words, the parts 101e and 102e penetrate into a gap between the rear side of the upper disc 2(1) to be gripped and a front side of a lower disc 2(2). In addition, lower ends 101f and 102f (only a lower end 101f is shown in the figure) of the elastic cylinders 101b and 102b are pushed to an upper part of the inner circumference face 2d of the center hole 2c of the lower disc 2(2). On the other hand, a disc contacting face of the short gripping claw 103 is pushed to only the inner circumference face 2d of the center hole of the uppermost disc 2(1).

The upper disc 2(1) is gripped by three gripping claws 101 to 103 assuredly. In addition, the upper disc 2(1) is assuredly gripped by the elastic transformation of disc contacting faces of two gripping claws 101 and 102, so that the upper disc 2(1) does not also fall off the gripping claws 101 and 102 in the disc thickness direction. Only parts of the disc contacting faces of two long gripping claws 101 and 102 contacts the lower disc 2(2), and the width of outer sides of the lower parts 101f and 102f is about 87% of an inner diameter of the center hole 2c. Accordingly, when the gripping claws 101 to 103 are lifted, only the upper disc 2(1) is lifted.

When the gripping claws 101 to 103 are pushed in the radial direction, the position of the upper disc 2(1) in the disc planar direction is fixed by the three gripping claws, but since the lower disc 2(2) contacts only two gripping claws 101 and 102, the lower disc 2(2) is pushed in the disc planar direction by the gripping claws 101 and 102. Accordingly, the lower disc 2(2) slides in a slightly horizontal direction relatively with respect to the upper disc 2(1). Although when the upper and lower discs 2(1) and 2(2) are tightly contacted, the lower disc 2(2) slides to penetrate the air between the upper and lower discs 2(1) and 2(2), and accordingly, the tight contact is alleviated or released. Accordingly, only the upper disc 2(1) can be lifted assuredly.

In addition, there is an advantage that the disc 2 is not damaged when the disc 2 is gripped since disc contacting faces of the three gripping claws 101 to 103 are formed of the elastic cylinders 101b to 103b.

Generally, the number of gripping claws is three, but the number of the gripping claws may be four or more. When the number of the gripping claws is four or more, the numbers and disposition of long gripping claws and short gripping claws are properly set, for example, by disposing the long gripping claws in an area less than a ½ times the inner circumference face which does not include a diameter of the center hole or the like (Disc Detecting Mechanism)

The gripping device 100 includes a disc detecting mechanism for controlling a stop position (insertion amount) at a time when the gripping claws 101 to 103 are inserted into the center hole 2c of the disc 2. Referring to FIGS. 6 to 9, the disc detecting mechanism 140 in this example is equipped with a disc detecting lever 141 and a disc detector 142 including a photo coupler. The disc detecting lever 141 is an L-shaped lever including a main part 141a in the shape of a straight line and a front end part 141b which bends at a right angle downward from a front end of the main part 141. A rear end of the main part 141a is attached to a top face of the arm base 55a where the rear end of the main part 141a can be rotated freely in an upper/lower direction. The main part 141a of the disc detecting lever 141 is disposed on the top face of the arm base 55a, and the front end 141b of the main part 141a protrudes downward from a rear side of an opening part 55d through the opening part which is formed on the arm base 55a. In a side of the main part 141a, a detection plate 141c which is protruded horizontally is formed. The detection area 142a of the disc detector 142 is disposed in the moving trajectory of the detection plate 141c which is accompanied by the upward/downward movement of the disc detecting lever 141.

When the disc 2 is not gripped, the disc detecting lever 141 is maintained horizontally on the arm base 55a. In this instance, the detection plate 141c is positioned within a detection area 142a of the disc detector 142 and is in an "off" status in which detection light passing the detection area 142a is blocked. As the gripping claws 101 to 103 are inserted into the center hole 2c of the disc 2 by lowering the transport arm 55, a front end part 141b of the disc detecting lever 141 contacts the surface of the disc 2, and the disc detecting lever 141 is lifted in accompaniment with the insertion of the gripping claws 101 to 103.

As shown in FIGS. 7 and 9(a), right before the lower end faces 111a to 113a of the support pins 111 to 113 supporting the gripping claws 101 to 103 contact the surface of the disc 2 after the gripping claws 101 to 103 have been completely inserted into the center hole 2c of the disc 2, the detection plate 141c gets off the detection area 142, and the disc detector 142 is shifted to an "on" position. Accordingly, the insertion of the gripping claws 101 to 103 into the center hole 2c of the disc 2 is detected.

(Connection Mechanism of Transport Arm and Timing Belt)

When the insertion position of the gripping claws 101 to 103 is controlled by using the detection mechanism 140, as shown FIGS. 7 and 9(a), there is a case where the inserting operation of the gripping claws 101 to 103 cannot be stopped precisely at a time when the gripping claws 101 to 103 are completely inserted into the center hole 2c of the disc 2 due to a manufacture error of the disc detecting lever 141, an attachment error of the disc detecting lever 141, an attachment error of the disc detector 142, a detection error of the disc detector 142, and the like. When the insertion is not sufficient, the disc 2 cannot be gripped by the gripping claws 101 to 103, and accordingly there is a possibility that a gripping defect occurs. On the other hand, when the gripping claws 101 to 103 are excessively inserted, the lower end faces 111a to 113a of the support pins 111 to 113 to which the gripping claws 101 to 103 are attached and the like come to contact the surface of the disc 2 to damage the disc 2, and there is a possibility that the disc may be destroyed in some cases. In order to prevent this disadvantage, in this example, a connection mechanism having a configuration that the transport arm 55 is connected to a timing belt 64 which is a lifting mechanism through an elastic member is used.

Figure 10A:
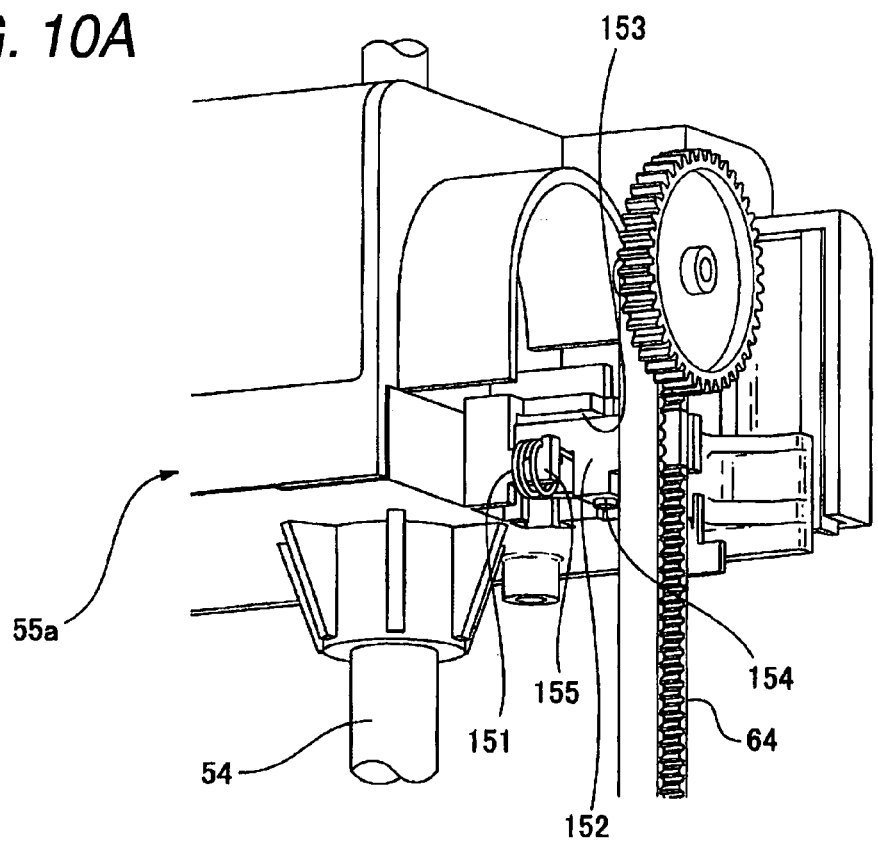
FIGS. 10A and 10B are a perspective view and an exploded perspective view showing a connection mechanism of a transport arm and a timing belt.
Figure 10B:
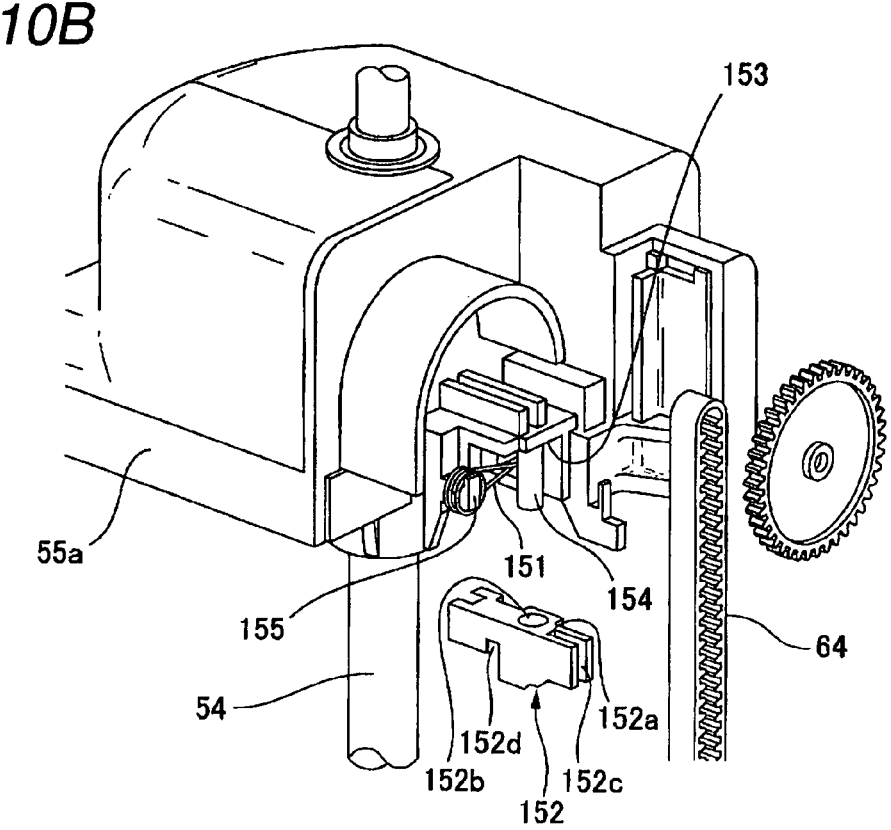

FIG. 10(a) is a partial perspective view showing a connection mechanism part, and FIG. 10(b) is an exploded perspective view of the connection mechanism part. Referring to FIGS. 7 and 10, the transport arm 55 is connected to a belt clip 152 which is fixed to a timing belt 64 through a spring member 151. A top face 153 facing downward and a ground shaft 154 in the shape of a cylinder which extends vertically from the top face 153 downward are formed in the rear end of the arm base 55a of the transport arm 55. The belt clip 152 includes an upper end face 152a which can contact to the top face 153 of the arm base side from a lower side, a shaft hole 152b which extends from the upper end face 152a through the belt clip 152, and a fixing part 152c which is fixedly connected to the timing belt 64. The shaft hole 152b becomes parallel to the vertical guide shaft when the belt clip 152 is fixed to the timing belt 64.

The belt clip 152 is attached to a rear end of the arm base 55a where the ground shaft 154 passes through the shaft hole 152b of the belt clip 152, and the upper end face 152a of the belt clip 152 contacts the top face 153 from the lower side. Accordingly, the transport arm 55 can be moved upward with respect to the belt clip fixed to the timing belt 64 through support parts including the ground shaft 154, the shaft hole 152b, the top face 153, and the upper end face 152a. In other words, the transport arm 55 can move in a direction that the gripping claws 101 to 103 are pulled up from the center hole 2c of the disc 2.

A groove 152d which receives the spring member 151 from the lower side is formed in a part disposed in a front side from the shaft hole 152b on a lower face of the belt clip 152. The spring member 151 is attached to a spring hanger 155 which is formed in a rear end of the arm base 55a and always biases the belt clip 152 upward. Accordingly, the arm base 55a is pushed to the belt clip 152 by the spring member 151, thus the movement of the arm base 55a upward is blocked. Although the ground shaft 154 is formed on the transport arm 55 and the shaft hole 152b is formed on the belt clip 152 in this embodiment, a shaft may be formed on the belt clip 152 and a shaft hole for receiving the shaft may be formed on the transport arm 55.

When the timing belt 64 is driven (see FIG. 5) by a lifting motor 56, the belt clip 152 fixed to the timing belt 64 lifts in one body. When an excessive load is not applied, the arm base 55a lifts along the vertical guide shaft 54 in one body with the belt clip 152 which is fixed to the timing belt 64 by the spring force of the spring member 151.

Here, when the transport arm 55 is lowered and the gripping claws 101 to 103 are inserted into the center hole 2c of the disc 2, it is assumed that the lower end faces 111a to 113a of the support pins 111 to 113 supporting the gripping claws 101 to 103 collide with the surface of the disc 2 before the disc 2 is detected by the above-described disc detecting mechanism 140.

In this case, an excessive load applies temporarily to the transport arm 55, and the spring member 151 is elastically transformed to be pushed in up/down directions. Thus, the collision force is alleviated owing to the elastic transformation of the spring member 151. Thereafter, when the belt clip 152 is lowered, the transport arm 55 maintains its position without being lowered since the spring member 151 is elastically transformed. As a result, the disadvantage in that the disc 2 is excessively pushed and destroyed or the like can be prevented.

The amount of insertion of the gripping claws 101 to 103 into the center hole of the disc is configured to be slightly sufficient, for example, with consideration of a detection error (non-uniformity of stop positions of the gripping claws 101 to 103) of the disc detecting mechanism 140 caused by a manufacture error, manufacture errors of the components, attachment errors thereof, and the like. Accordingly, the disc gripping defect of the gripping claws 101 to 103 can be prevented. In addition, when the support pins 111 to 113 (gripping members) to which the gripping claws 101 to 103 are attached contact the surface 2b of the disc in inserting the gripping claws 101 to 103, the spring member 151 which is an elastic member is elastically transformed, and accordingly, the collision force applied to the disc 2 is alleviated. In addition, after the support pins 111 to 113 contact the disc 2, the spring member 151 is elastically transformed to push in the up/down directions, and accordingly, the transport arm 55 does not move further in the insertion direction. As a result, the disc 2 is not damaged by the support pins 111 to 113.

As described above, since the transport arm 55 is attached to a timing belt 64 which is a simple moving mechanism movable in a direction opposite to the gripping direction of a disc 2, a moving mechanism for moving support pins is not required in the vicinity of the support pins 111 to 113 of the transport arm 55, and accordingly, the vicinity of the support pins 111 to 113 can be formed thin and light.

Accordingly, since the inertia in moving the transport arm 55 is small, the transport arm can be moved at a high speed, and it is possible to miniaturize the device.

(Operation of Disc Gripping)

Figure 11:
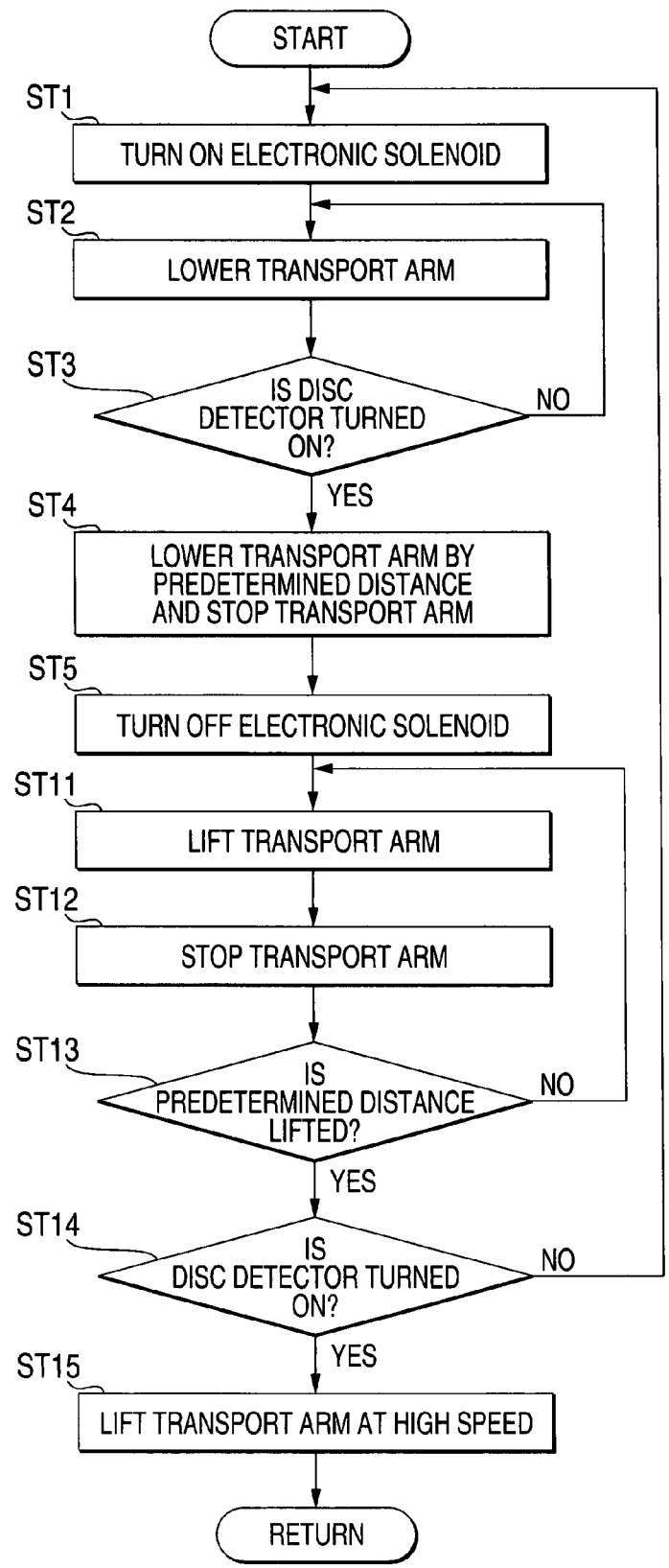
FIG. 11 is a schematic flowchart showing a disc gripping operation of the disc moving mechanism.

FIG. 11 is a schematic flowchart showing a disc gripping operation performed by the disc moving mechanism 6 having the above-described structure.

For example, a case where a blank disc 2A stored in a blank disc stacker 11 is gripped and lifted to be transported to another part will be described. In this case, the position of the transport arm 55 is determined to be a predetermined position right above the blank disc stacker 11 under the control of the control unit 7.

The electronic solenoid 126 of the gripping mechanism 100 which is installed in the transport arm 55 is turned on (step ST1). When the electronic solenoid is shifted to "on", its operation rod 126a is pulled in, the movement of the operation rod 126a is transferred to the rotation plate 121 through the L-shaped link 125, and accordingly, the rotation plate 121 is rotated by a predetermined angle in a direction of arrow R2 shown in FIG. 8. Remaining rotation plates 122 and 123 are rotated by the same angle in the same direction, the gripping claws 101 to 103 which are attached to front ends of the support arms 121c to 123c of the three rotation plates 121 to 123 respectively move in directions approaching one another, and accordingly, the gripping claws are collected to be inserted into the center hole 2c of the disc 2A.

Thereafter, the motor 56 for lifting the transport arm is driven to start a lowering operation of the transport arm 55 (step ST2). When the transport arm 55 is lowered to approach an uppermost blank disc 2A, the detection lever 141 of the disc detecting mechanism 140 which is built in the transport arm 55 contacts a surface of the blank disk 2A. Then, the detection lever 141 moves relatively upward in accompaniment with the lowering of the transport arm 55, the detection plate 141c of the detection lever 141 gets off the detection area 142a of the disc detector 142, and accordingly, the disc detector 142 is shifted to "on" (step ST3). The transport arm 55 is lowered by a predetermined distance to stop the transport arm 55, and the gripping claws 101 to 103 of the gripping device 100 disposed in the transport arm 55 are inserted into the center hole 2c of the blank disc 2A (step ST4). When a stepping motor is used as the motor 56 for lifting the transport arm, for example, the position of the transport arm 55 is determined by the number of steps of the stepping motor.

After the above-described insertion process in which the three gripping claws 101 to 103 are inserted into the center hole 2c of the blank disc 2A to be gripped is completed, the gripping claws 101 to 103 inserted into the center hole 2c are pushed outward in a direction of the diameter of the center hole 2c to be pushed to the inner circumference face 2d of the center hole 2c. In other words, the electronic solenoid 126 is turned off, so that the operation rod 126a is returned to the protrusion position (step ST5). As a result, the rotation plate 121 connected to the operation rod 126a through the L-shaped link 125 is rotated in the direction of arrow R1 shown in FIG. 8 by the spring force of the helical extension spring 124 to return to its original position. In the linkage of the movement of the rotation plate 121, the remaining two rotation plates 122 and 123 are rotated by the same angle in the same direction to return to their original positions. Therefore, a disc gripping status in which the gripping claws 101 to 103 attached to the rotation plates 121 to 123 are pushed outward in the direction of the diameter of the center hole and into the inner circumference face 2d of the center hole of the blank disc 2A.

After the above-described disc gripping process is completed, a disc lifting process in which the gripped blank disc 2A is lifted by lifting the transport arm 55 via the gripping claws 101 to 103 is performed (steps ST11 to ST15).

In the disc lifting process of this example, until the transport arm 55 is lifted by a predetermined distance, that is, until the gripping claws 101 to 103 move by a predetermined distance in a direction opposite to the insertion direction, the transport arm 55 is lifted intermittently. In other words, a lifting operation which lifts the transport arm 55 by a predetermined distance at a predetermined speed, and a stop operation which stops the transport arm 55 for a predetermined time are repeated a predetermined number of times (steps ST11 to ST13). When the motor 56 for lifting the transport arm is a stepping motor, the lifting distance can be managed by the number of steps of the stepping motor.

After the intermittent moving process is performed, it is detected whether the blank disc 2A is gripped and lifted by the gripping claws 101 to 103 based on an output of the disc detecting mechanism 140 (step ST14). When the blank disc 2A is lifted, the detection lever 141 of the disc detecting mechanism 140 is in a status that the detection lever 141 is moved upward by the lifted blank disc 2A, and the disc detector 142 is in an "on" status. Accordingly, it can be detected whether the blank disc 2A is assuredly gripped and lifted by the gripping claws 101 to 103 based on the output of the disc detecting mechanism 140.

When the blank disc 2A is not lifted, the process is returned to the step ST1 again, and the gripping and lifting operation of the blank disc 2A is performed again from the start. When the blank disc 2A is lifted, a high-speed continuous moving process in which the transport arm 55 is lifted continuously to a position of a predetermined height at a speed higher than the lifting speed of the transport arm in the intermittent moving process is performed (step ST15).

In this example, the transport arm 55 is, at first, lifted intermittently at a low speed. As described above, the transport arm 55 is connected through the spring member 151 to the timing belt 64 which is a driving member of the lifting mechanism. When there are deviations in the insertion stop positions of the gripping claws 101 to 103, which are determined by the operation of the disc detecting mechanism 140, the gripping claws 101 to 103 are inserted into the center hole 2c of the disc without incurring any damage to the disc 2A owing to the elastic transformation of the spring member 151, and the lower end faces 111a to 113a of the support pins 111 to 113 to which the gripping claws 101 to 103 are attached contact the surface of the disc.

The transport arm 55 is pushed to the front side of the disc by the spring force of the spring member 151. In other words, the blank disk 2A is pushed to the blank disc 2A in the lower side by the spring force of the spring member 151 from the upper side. When the gripping claws 101 to 103 are pushed in this manner, if the friction force between the upper and lower blank discs 2A is higher than the pushing force of the gripping claws 101 to 103, the blank disc 2A cannot be moved in a horizontal direction. As a result, it is possible that the inner circumference face 2d of the center hole 2c of the blank disc cannot be gripped assuredly from the inside by the three gripping claws 101 to 103.

Particularly in this example, as shown in FIG. 9, it is possible that the gripping claws 101 and 102 cannot be opened by pushing the discs in a horizontal direction when long gripping claws 101 and 102 extend to the inner circumference faces of the two discs and the discs are pushed from the up side.

In order to prevent this disadvantage, when the transport arm 55 is lifted in the gripping operation of this example, at first, an intermittent lifting operation is repeated. The pushing force of the blank disc 2A is slowly alleviated by repeating slight lifting and stopping operations of the transport arm 55. When the pushing force applied to the blank disc 2A is alleviated to some degree or the pushing force disappears, it becomes possible to push out the blank disc 2A in a horizontal direction by the gripping claws 101 to 103. As a result, as described with reference to FIG. 9, the upper and lower blank discs 2A are relatively slid by the gripping claws 101 to 103, and accordingly, only the upper blank disc 2A is gripped. Since the blank disc 2A is assuredly gripped by this intermittent moving process, a disadvantage in that the blank disc 2A falls off or the like while the blank disc 2A is lifted can be prevented.

(Detailed Example of Label Printer)

Figure 12:
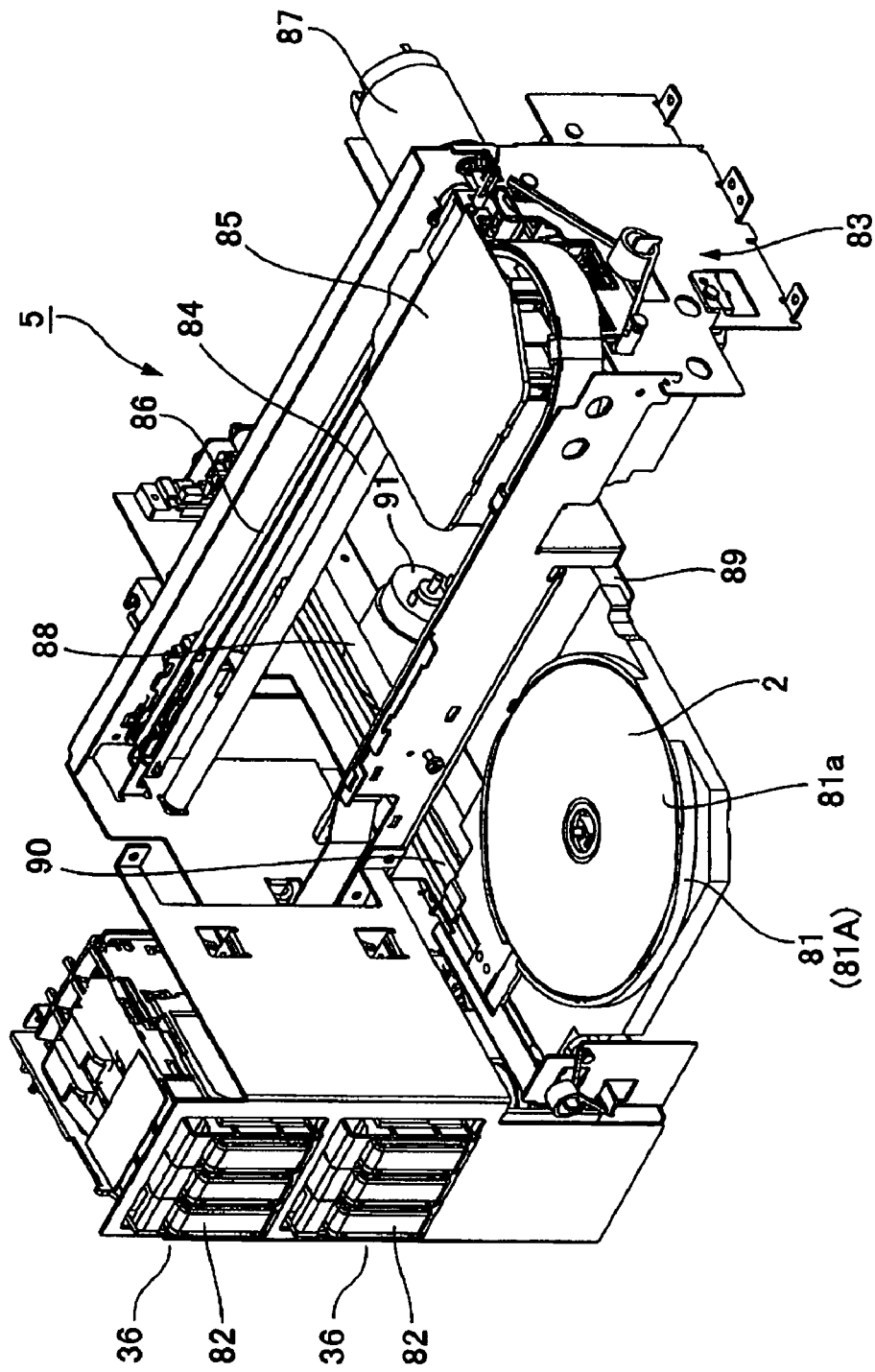
FIG. 12 is a perspective view showing a printer of a CD publisher.
Figure 13:
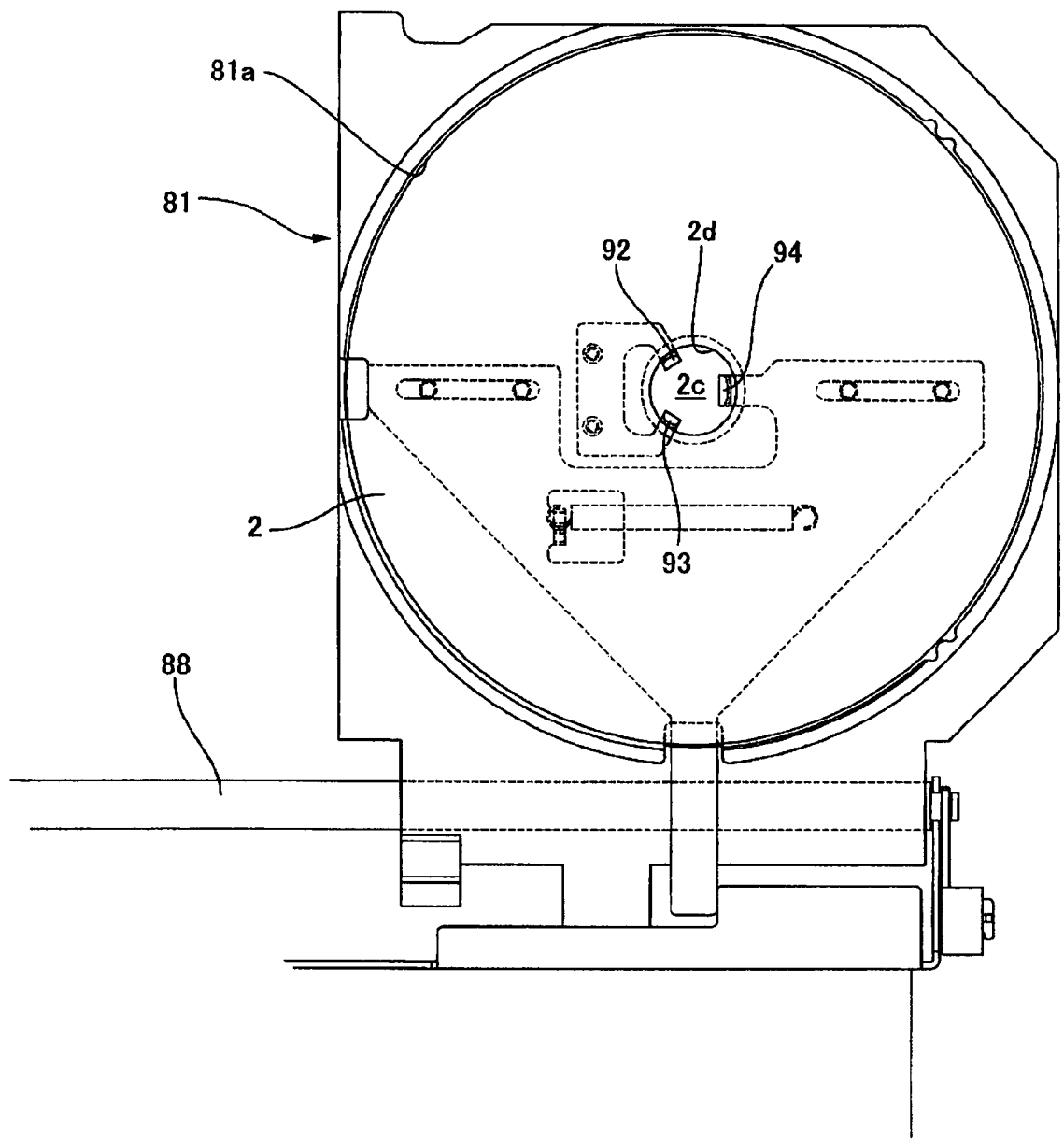
FIG. 13 is a plan view showing a printer tray of the printer.

FIGS. 12 and 13 are a perspective view showing a detailed example of a label printer 5 and a plan view showing a printer tray 81 of the label printer, respectively. Hereinafter, the configuration of the label printer 5 will be described with reference to the figures.

The label printer 5 includes a chassis 83 and a carriage guide shaft 84 extending horizontally between left and right side plate parts in a rear side of the chassis 83, so that a head carriage 85 in which an ink jet head (not shown) is built can reciprocate in left/right directions along the carriage guide shaft 84. A carriage driving mechanism includes a timing belt 86 that extends horizontally in left/right directions and a carriage motor 87 that is used for driving the timing belt 86.

The ink jet head which is built in the head carriage 85 has a nozzle face disposed downward, and a printer tray 81 can reciprocate rear side positions of the ink jet head horizontally in front/rear directions. The printer tray 81 has a right end that is supported by a guide shaft 88 extending horizontally in the front/rear directions and a left end that is supported by a guide rail 89 extending horizontally in the front/rear directions such that the guide rail 89 can slide. A driving mechanism of the printer tray 81 has a configuration including a timing belt 90 that extends horizontally in the front/rear directions and a tray motor 91 that is used for driving the timing belt 90.

The printer tray 81 includes a shallow depression part 81a that is used for loading a disc 2 in a front face of a rectangular shaped plate. A center part of the depression part 81a includes three vertical claws 92 to 94 disposed at 60-degree intervals in the same circle. One vertical claw 94 can be moved in a radial direction, and the remaining two vertical claws 92 and 93 are disposed in a fixed position. One vertical claw 94 is configured to be moved by a driving mechanism such as an electronic solenoid that is not shown in the figure.

When the disc 2 falls from an upper side into the depression part 81a with a label side 2a up, as shown in FIG. 13, three vertical claws 92 to 94 are inserted into a center hole 2c of the disc 2. Thereafter, when the vertical claw 94 is moved slightly outward in a radial direction, the three vertical claws 92 to 94 are pushed to an inner circumference face 2d of the center hole 2c of the disc 2 from an inner side. Accordingly, the disc 2 is maintained in the printer tray 81. The printer tray can be moved to a print region of the ink jet head by driving the tray motor 91 to move the printer tray 81 to a rear side along the guide shaft 88. Thereafter, printing on a print side of the disc 2 can be performed by the ink jet head.

The present invention is not limited to the above-described embodiments and various modifications thereof can be made. For example, in the above-described exemplary embodiment, all the three gripping claws 101 to 103 are moved in a center side, but only one of the gripping claws may be movable, like the technology disclosed in Patent Document 1, and the gripping portion may push on a spherical surface.

Although the arm is moved by the moving mechanism having a timing belt in the embodiment as an example, the arm may be moved by a rack gear or a screw. In the exemplary embodiment, an example in which the arm base 55a is pushed to the belt clip 152 by the spring member 151 of the torsion spring, so that the movement of the arm base 55a is blocked above the belt clip 152, but only the weight of the arm without the spring may be applied. However, it is preferable to bias using a spring since the arm follows the speed of the belt. The shape of the spring member 151 is not limited, and a compressive spring or a leaf spring may be used as the spring member.

Although the gripping member is inserted into the center hole of the disc in the embodiment as an example, the disc may be held at its outer circumference or the disc may be picked by suction. The present invention can be applied to various devices in which an upper surface of the disc is pressed.

What is claimed is:

1. A disc gripping device, comprising:
   a plurality of gripping portions that are inserted into a center hole of a disc to be gripped, thereby gripping the disc;
   a plurality of contact portions supporting the gripping portions, respectively, the contact portions each having a contact face for contacting an upper face of the disc;
   an arm supporting the gripping portions so that the gripping portions are movable in a radial direction of the center hole, wherein the contact portions are attached to the arm; and
   a moving mechanism that moves the gripping portions in an inserting direction into the center hole of the disc,
   wherein the arm is supported by the moving mechanism such that the contact portions are movable in a direction opposite to the inserting direction with respect to the moving mechanism, and
   wherein after the contact face contacts the upper face of the disc when the gripping portions are moved in the inserting direction to be inserted into the center hole of the disc, the contact portions are moved in the direction opposite to the inserting direction with respect to the moving mechanism so that the contact portions are not moved further in the inserting direction.

2. The disc gripping device according to claim 1, wherein the arm is pushed in the inserting direction.

3. The disc gripping device according to claim 1, further comprising a spring member that pushes the arm such that the contact portions are located in a predetermined position with respect to the moving mechanism.

4. The disc gripping device according to claim 1, wherein the arm is movable in a direction parallel to the inserting direction with respect to the moving mechanism.

5. The disc gripping device according to claim 1, further comprising a disc detecting mechanism that detects a stop position of the contact portion, in which the contact portions contact the disc, wherein the disc detecting mechanism is mounted in the arm.

6. A disc processing apparatus, comprising:
   a disc storage that stores stacked discs in a thickness direction of the discs;
   a disc processor including at least one of a disc drive which performs data writing or data reading with respect to one of the discs and a label printer which performs printing on a label face of one of the discs; and
   a disc moving mechanism that moves the one of the discs between the disc storage portion and the disc processor, wherein the disc moving mechanism includes the disc gripping device according to claim 1.

7. A disc gripping device comprising:
   a plurality of gripping portions that are inserted into a center hole of a disc to be gripped, thereby gripping the disc;
   a plurality of contact portions supporting the respectively, the contact portions each having a contact face for contacting an upper face of the disc;
   an arm supporting the gripping portions so that the gripping portions are movable in a radial direction of the center hole, wherein the contact portions are attached to the arm; and
   a moving mechanism that moves the gripping portions in an inserting direction into the center hole of the disc, wherein the contact portions are movable in a direction opposite to the inserting direction relative to the moving mechanism, and wherein after the contact face contacts the upper face of the disc when the gripping portions are moved in the inserting direction to be inserted into the center hole of the disc, the contact portions are moved in the direction opposite to the inserting direction relative to the moving mechanism so that the contact portions are not moved further in the inserting direction.

* * * * *